April 15, 1930.  S. W. BORDEN  1,754,601
ELECTRICAL CONNECTING DEVICE FOR ELECTRICAL CONNECTING SYSTEMS
Original Filed Jan. 22, 1925  2 Sheets-Sheet 2
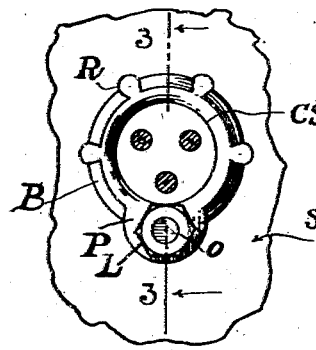
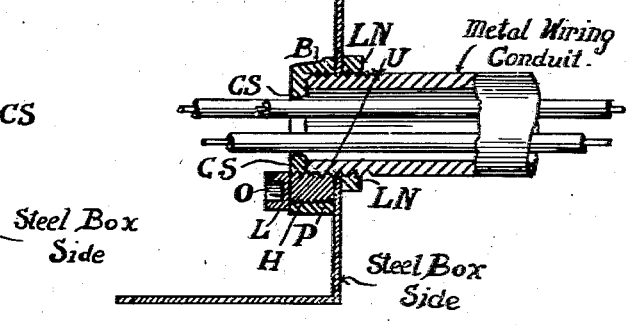
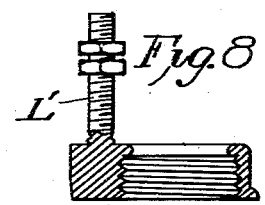
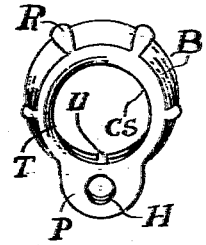
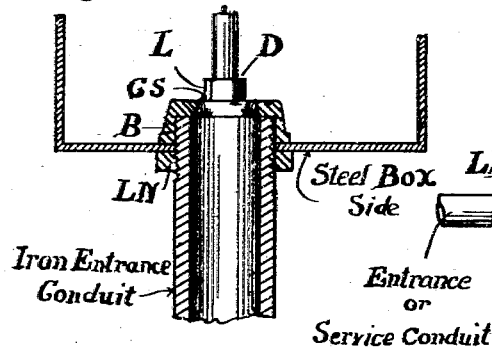
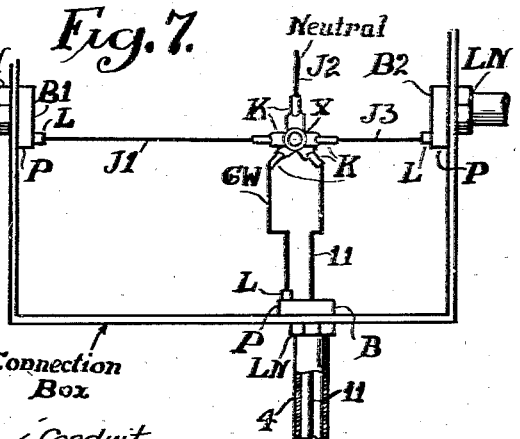
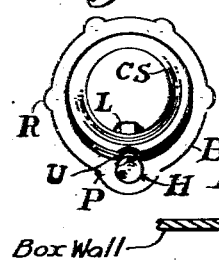
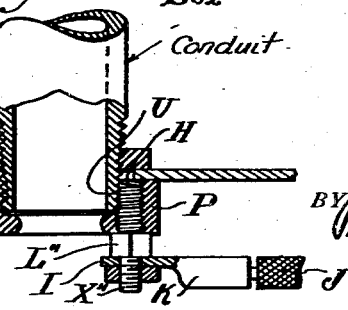
INVENTOR.
Stephen W. Borden
BY Philip Farnsworth
ATTORNEY.

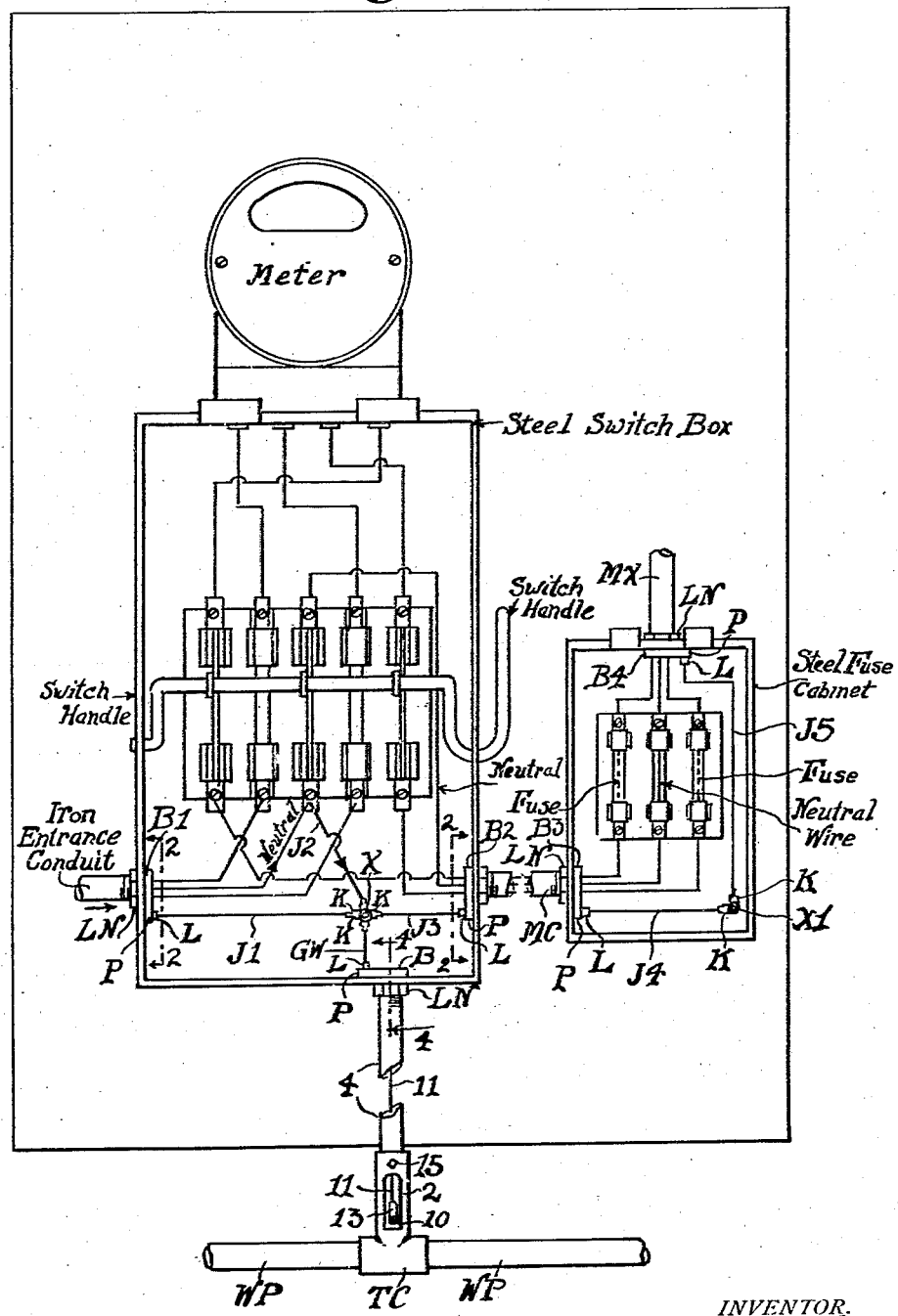

Patented Apr. 15, 1930

1,754,601

UNITED STATES PATENT OFFICE

STEPHEN W. BORDEN, OF SUMMIT, NEW JERSEY, ASSIGNOR, BY MESNE ASSIGNMENTS, TO CROUSE-HINDS COMPANY

ELECTRICAL CONNECTING DEVICE FOR ELECTRICAL CONNECTING SYSTEMS

Original application filed January 22, 1925, Serial No. 3,913. Divided and this application filed July 11, 1925. Serial No. 42,869.

This application is a division of my application Serial No. 3,913 filed January 22, 1925.

This invention relates to improvements in electrical connecting devices for electrical connecting systems, and more particularly to connecting devices for electrical conduit systems, including grounded conduit systems.

The object of the invention is to improve such electrical connecting devices in general, and particularly for the purpose of connecting conduits for electrical wiring, both in respect of reducing or preventing hazards to persons or property and of increasing the facility of compliance with electrical codes and underwriters' regulations.

The invention comprises the connecting devices described and claimed hereinafter in connection with the drawings and equivalents thereof, of which Fig. 1 is a diagrammatic view showing connecting devices of the invention in a preferred use, in an assembly of parts constituting a practical form of connecting or grounding system, and Figs. 2-6 are views illustrating a preferred form of the connecting device of the invention, this device being in the form of a conduit-bushing connector illustrated in plurality in the system of Fig. 1;

Fig. 2 being an end elevation looking with arrows 2—2 of Fig. 1 toward the inside wall of the box from the switch and connections;

Fig. 3 being a longitudinal section of the device of Fig. 2 and shown as located in place in the metal wall of the steel switch box of Fig. 1, and showing the metal service- or entrance-conduit of Fig. 1 for the service wires, and showing the soldering stud L (without jumper wire or lead) in place in the connecting device;

Fig. 4 being a section similar to Fig. 3 but looking with the arrow 4 of Fig. 1 and showing also the jumper or pig-tail extending inside the switch-box of Fig. 1 from the soldering stud L of the connecting device of Fig. 3 to the stud X of Figs. 1 and 4;

Fig. 5 being a perspective featuring the inside of the connecting device and showing the distorting action of the soldering stud L thru the connecting device on the metal threaded conduit; and Fig. 6 being a perspective featuring the outside of the connecting device and showing the lateral connecting ear P for the soldering stud L or the screw stud X, and finally Fig. 7 is a diagram of a modified and preferred form of the system of Fig. 1, showing the device of Figs. 2-6 in service;

Figure 8 is a sectional view of a fitting in which the projecting member L' is formed integrally with the rest of the fitting and Fig. 9 shows member L" in the form of a double-end stud screwed into the hole H.

In Fig. 1 is shown most prominently the ordinary steel switch-box or connection-box enclosing the switch controlling the building circuits or load circuits of a public service electrical power or lighting system. There is shown, for purpose of illustration, an ordinary three-wire system, of direct or alternating current, with neutral wire to be grounded; altho the electrical system might be a system of any number of service wires, one of which and/or the conduit or connection-box of which, is to be grounded. The iron service conduit enclosing the service wires leading into the switch-box is shown at the lower left, its righthand end projecting more or less thru a wall of the box in an opening therein. The entering service wires then lead to the switch, as shown. These wires, after leaving the switch as load circuits or building circuits, are led to an iron load conduit MC, thru which they pass to a steel fuse-box on their way to the utilization equipment or translating devices in the building after connection to the fuses in the fuse-box as shown.

The neutral wire inside the switch-box is grounded in any suitable manner, as via a grounding conduit 4 or a cable 11 extending therethru; but preferably in a particular manner to be described. Conduit 4 enters a wall of the metal switch-box in a manner also to be described later. To the lower end of conduit 4 is connected an iron fitting 2, which is secured so as to be in good electrical connection with the grounding conductor, such as a waterpipe WP. An insulated wire or cable 11, preferably, extends thru grounding conduit 4 for use in certain cases, as described in connection with Fig. 7. This cable 11 is not connected up with the system of Fig. 1.

Heretofore such systems and the service and load conduits have been grounded generally in the following manner. A ground wire has been connected to the neutral wire inside the box and extended outside of the box thru an insulator in the box wall. To such ground wire outside the box, jumper wires have been connected which led to clamps around the service and load conduits outside the box, reliance for grounding of the box having been placed on the electrical connection between the conduits and box which might be established by the screwing up of the bushings tightly against the box wall and thereby connecting the box to the ground wire via the bushings, the conduits, the clamps thereon, and the jumper wires from the clamps, to the ground wire exposed outside the box. Or sometimes the ground connection from the neutral wire has extended out of the box thru a grounding conduit, with clamps outside the box around the three conduits (service, lead and grounding conduits) connected together by jumper wires. The objections to such systems are numerous. The exposure of the grounding wires or connections outside the box to the dangers of disturbance and injury by the conditions of the usual environments of the switch-box, greatly increases the hazard to life and property, and particularly the fire hazard. The inadequacy of box grounding via the bushings is due to the fact that the bushings are liable to become loosened sufficiently to break contact with the box and to the fact that, in the first place, the bushings might never be initially screwed up into good contact with the box. The construction is unsightly and makeshift in appearance and involves possibly inefficient electrical connection by the clamps to the conduits, as such conduits are usually covered with an insulating enamel or paint.

In accordance with the present invention, the grounding system is of such nature that all wires extending into and out of the switch-box thru the walls thereof are enclosed and protected at all points outside the box by iron conduits, to that end the wires which ground the service (entrance) and load (exit) conduits, or both, being located (as heretofore have been only the service and load wires themselves) wholly inside the box; and by this means all grounding wires are permitted to be and are entirely enclosed by the box and the grounding conduit, on account of the resulting lack of need of any exposed grounding wires outside the box. Also in this invention all grounding connections are made with the conduits and the box in such way as to cause permanent perfect grounding.

In Fig. 1 each of the three iron conduits shown (i. e., the service or entrance conduit, the exit or load conduit MC, and the grounding conduit 4) project more or less into the steel switch-box thru holes ("knockouts") in the box sides. As usual, these conduits are exteriorly threaded at their ends, as shown, with standard tapered conduit threads, for engagement with lock-nuts LN located outside the box and interiorly-threaded bushings B, B¹ and B² located inside the box and on the ends of the conduits projecting inside the box; these locknuts and bushings lying on opposite sides of the box wall and capable of being clamped against it toward one another; but with the present invention it is not necessary thus to secure the conduits tightly to the box. The only functions of the bushings, save for their inadequate use in grounding contact with the box, have been to cooperate with the lock-nuts to secure the conduits to the switch-box and to provide in their own integral structure a means (see below) for protecting from abrasion the insulation of the service and load wires as they extend into and out of the switch-box from and to the conduits. For the purpose of securing the conduits to the box, the bushings have been interiorly screw-threaded as shown in Figs. 3–6, and that feature may be and preferably is retained in the present invention. For the purpose of protecting the insulation of the service and load wires from abrasion, the bushings have been formed with the rounded inwardly radially extending shoulder CS, shown in Figs. 3–6, and this feature may be and preferably is retained in the present invention. Such shoulder extends inwardly of the internal threads, overlaps the end of the wall of the conduit which projects into the box and extends over a portion of the end opening of the conduit inside the box, all as shown most clearly in Fig. 3; the result being that the bushing cannot be screwed on the conduit beyond the end thereof. Also the right hand end of the bushing (Fig. 3) abuts against the inside wall of the box thereby also preventing the bushing from being screwed beyond the end of the conduit which projects inside the box only to the extent necessary to permit of the bushing being attached to the end of the conduit. These bushings have had no greater wall-thickness than was desirable to give them the strength necessary for their function of cooperating with the lock-nuts to secure the conduits to the switch-box with sufficient tightness to obtain such electrical connection with the box as might be obtained by such crude grounding means, the bushings, as stated, being liable to loosen from the end of the conduit.

In order to provide a means permitting such ground wires to be located inside the connection box or boxes, I have modified the ordinary construction of the bushings (as at B, B¹ and B², Fig. 1), so that advantage can be taken of the fact that the bushing has good electrical connection with the conduit (by virtue of its threaded engagement therewith) to permit a jumper wire to be connected with the bushing, which jumper can be connected, as will be described, for suitable grounding via the grounding conduit and/or cable therein and without any extension, exposed, outside the connection box. A preferred form of the resulting modified form of bushing is shown in Figs. 2–6. These modified bushings may be used in the switch-box not only in connection with the service conduit (as at B¹) and with the load conduit (as at B²), but also in connection with the grounding conduit (as at B). Also, such new bushing-connectors may be applied to the connections of the fuse-box with the load conduits, as at B³ and B⁴.

The box-interior member of the means of securing the conduit and box together which I utilize for the above purpose is preferably the interiorly-threaded bushing which is formed with the rounded or curved shoulder CS of Figs. 2–6; altho in the system of Fig. 1 or Fig. 7 it is not absolutely necessary that the grounding device be formed with such shoulder. Such shoulder, however, serves most usefully to protect and prevent from abrasion the insulation of the wire or cable inside the conduit as it leaves or enters the box. The interior screw threads of this bushing also now serve the most important function of making good contact with the conduit, which is the important thing to be done quite irrespective of whether the bushing is screwed up tight against the box-wall. Because the jumper wire (which now, located inside the box, is connected to the bushing) serves as part of the means for grounding the box, the box need no longer be put in electrical connection with the conduit by tightly screwing up the bushing so as to ground the box by way of the bushing and conduit; that is, no reliance for grounding purposes is placed on the fortuitous electrical connection between the box and the conduit via the bushing. This is very important because at best that was not a reliable connection on account of the liability of the bushing becoming loosened from the contact with the box, not to mention the possibility of the bushing not having been initially secured in good electrical connection with the box, or the possibility of its being withdrawn from contact with the box due to settlement of the building.

As indicated generally in Fig. 1 and more clearly in Figs. 2–6, the entrance-bushing B¹ (like the other bushings shown in Fig. 1) is formed with a greater wall-thickness than heretofore for at least a portion of its periphery so as to provide an outwardly and radially-extending ear or lug P which extends sufficiently far around the periphery to permit the making of a good electrical connection or joint between such bushing and a jumper wire or lead which is to extend to another metal part desired to be connected thereby with the bushing. In Fig. 1 this ear or lug construction P is shown as including a bronze portion L which extends from the bushing into the switch-box in a direction parallel with the service conduit, i. e., at right angles to the diametrical plane of the bushing itself, thereby avoiding any undue increase of any diametrical dimension of the bushing which might tend to increase the difficulty of manipulating the bushing in a cramped location in a corner of the box. From such projecting portions L of the various bushing-connectors of Fig. 1, extend the respective jumper wires in the switch-box, i. e., J¹, J² and GW. Preferably, as clearly shown in Figs. 2–6, this extension L or lead-carrying or lead-attaching projection is in the form of a threaded soldering stud which is screwed into lug P of the bushing and has an end hole O (Fig. 3) receiving an end of a jumper or lead to be fused (soldered or welded) therein. When extension L is in the form shown in Fig. 3 it tends to prevent the bushing becoming loose on the conduit since it forces the conduit rigidly against the opposite side of the bushing. But extension L may assume other forms and need not be separate from the rest of the bushing as shown in Figure 8. In any case, however, the connection of the jumper to the bushing makes it unnecessary that the bushing be initially or ever screwed up tight so as to make electrical connection between the box and the conduit. All that is necessary is that the bushing carrying the lead or jumper be screwed on the end of the conduit so as to make good electrical connection therewith via the threaded engagement; and preferably that when such engagement is had, the bushing will be in such relation in respect of lug P and extension L that the latter will be located sufficiently far away from a corner of the box as readily to permit attachment of the jumper connection to the bushing. In any case, the threaded connection between the conduit and the bushing affords a good electrical connection of the conduit to the lead or jumper, provided that the jumper is well connected to the bushing; and the bushing is not likely to become entirely detached from the conduit, even in the absence of a locking means such as extension L in the form of the screw stud of Fig. 3. My bushing-connector is adequate for its purpose provided that it is so constructed as to permit permanent good connection with the conduit and with a jumper wire or other lead extending in the interior of the box, substantially as in Fig. 1, Fig. 8 or Fig. 9. The jumper J of Fig. 4 has one end soldered in hole O (Fig. 3) in screw-stud L, and its other end is soldered in an ordinary clamp type of terminal or soldering lug K, having a hole therein at one end for the passage of stud or bolt X of Fig. 1, and in its outer end a soldering hole for the jumper J as shown in Fig. 4. This complete jumper J, L of Fig. 4 is duplicated in Fig. 1 at each of the bushing-connectors, including those in the switch-box at J, J³ and GW.

The construction of the conduit bushing-connectors by which jumper connections may be made with them, may assume many and various forms pursuant to the invention whereby the wires which ground the service and load conduits are located in the switch-box by being connected to the bushings and then suitably grounded, as via a grounding conduit 4 and/or cable 11, so that no ground wires are exposed outside the switch-box. But preferably the bushing construction by which jumper-connection is made is not such as to add materially to the diameter or wall-thickness of the bushing; and preferably any bushing-extension of substantial dimension to which the jumper or other lead is connected should extend in line with the service conduit. While a preferred form of bushing-connector of this type is shown in Figs. 2–6, yet various forms are practical in any arrangement conforming to my conception of locating the ground jumper inside the box and connecting one end of such a jumper to a connecting device inside the box (such as the bushing) which in turn is electrically connected with the end of the conduit adjacent the box, instead of being clamped, as heretofore, to the conduit outside the box. Preferably, the ear or lug P on the interior connecting device or bushing B¹ (Fig. 1) is sufficient in dimension to permit effective attachment to it, as by clamping, of a clamping lug terminal K (Fig. 4) on an end of the jumper, above described in detail, as an alternative to the different form of screw-stud device L of Figs. 3 and 4; altho, as above stated, it is desirable in general to limit the diametrical dimensions of the bushing-connectors in order to permit convenient manipulation in installing.

In the preferred form of connecting device shown in Figs. 2–6, the threads on soldering stud L are finer than those on the conduit and the main part of the bushing (say 14 threads to the inch on the conduit and 20 threads per inch on stud L). The hole to receive stud L, which is tapped in ear P of the bushing, is so located that it breaks thru the bushing wall to the inside thereof, partly or wholly destroying the bushing threads at that point, as shown at U, Figs. 5, 3 and 6. Or at least the two threads of the two passages conflict with one another sufficiently to permit the following action.

As shown in Fig. 3, the stud L is of such length that when screwed home in the bushing the end of the stud stops short of the side of the box; but the stud is long enough so that the two threaded members overlap at their threaded portions, the threads of the stud L, for a substantial portion of its length near its end, engaging or conflicting with the preferably differently pitched threads of the conduit; and as the stud is screwed home, one or both sets of threads are mutilated or distorted so that the stud itself cannot become loosened and can be removed only by such re-forming of its threads as can be produced only by the application of practically as much force (as by a wrench) as was employed to screw it home. The bronze (non-ferrous) threads of L in contact with the iron threads of the conduit constitute a non-corrosive contact which also is permanent mechanically owing to the thread-conflict.

As to the accessibility of the bushing for screwing to the end of the conduit which projects more or less into the box, the parallelism of the tapped hole for the screw stud with the main passage thru the bushing, permit extension L to lie in the same direction as the conduit but away from the conduit, thereby providing minimum conflict in respect of adjacent parts of the box. In use, ordinarily before screw-stud L is screwed into its position shown in Fig. 3, one end of jumper J (Fig. 4) is soldered at D in the hole O (Fig. 3) in the end of the stud, so that in installing all that is necessary, after the ordinary assemblage of box, conduit and bushing, is to screw in the stud L, as above described, and then to connect the other end of the jumper wire to the desired conducting part, such as stud X, of Fig. 1, or to projection L of another bushing, as B of Fig. 1, on the ground-conductor 4. Different forms of my bushing-connector may be employed in the same installation as in Fig. 1, as for example in the case last mentioned, where bushing B may be specifically different in construction from bushing B¹, i. e., from that shown in Figs. 2–6. In such case the projection L on bushing B may be more nearly suited to be secured to terminal K of the jumper, as by means of a stud and nut in the manner shown at X, Fig. 1 as shown in Figure 9.

In any case, the lug or ear P and the projection L may be duplicated in a given bushing, if desired. It is permissible, altho not preferable, that the ear P extend around the entire periphery of the bushing. As a completed article of manufacture for use by the installer of any such systems as Fig. 1 or Fig. 7, the connecting device usually will comprise the bushing and its attached jumper J (Fig. 4) with the jumper terminal K at the other end; but the article as sold may comprise only my novel bushing-connector itself.

From the above, it will be seen that the preferred form of connecting device shown in Figs. 2-6, in addition to providing protection against abrasion of the wire insulation by its rounded shoulder CS, and in addition to its function of preventing the conduit from pulling out of the hole in the box wall, possesses the following advantages. It may have a minimum increase of diametrical dimensions, preferably only at P (Figs. 2, 5 and 6), i. e., just sufficient to provide for the reception of screw stud L (Fig. 3), which projects inwardly in the box in line with the conduit. The bushing is locked tight to the conduit (not the box) by means of the bronze stud L, so that there is no possibility whatsoever of the bushing working loose from the conduit, the bushing, therefore, being permanently retained in good contact relation with the conduit. The bronze stud L itself makes good bronze-to-iron contact with the conduit, independently of and in addition to the contact between bushing and conduit, and irrespective of the kind of metal of which the bushing itself is composed. In addition to the function of stud L as a set screw for securing the bushing to conduit, this stud is a self-locking member which cannot work loose, because the threads of the stud or the conduit (whichever be softer) are distorted automatically as the stud is screwed home and into the wall of the conduit. On account of the set screw L (and whether or not its threads as preferred be distorted to interlock with the threads of the conduit) the installer can stop screwing the bushing on the conduit at the point in the rotation of the bushing when lug L or ear P is in a position sufficiently remote from a wall or the bottom of the box to permit the convenient screwing in of the stud carrying its jumper J, and this whether or not at that point of the rotation of the bushing it is fully screwed up on the conduit.

From the above it will be seen also that in the system of Fig. 1 or Fig. 7; however modified in general arrangement of grounding-jumpers or specific construction of bushing-connectors, the reliance for establishing and maintaining electrical connection is placed on the permanent and perfect contact which is made by the metal bushing connected on the one hand by its threads to the conduit and on the other hand to its jumper wire, the other end of which can be connected to any desired conductor, as shown in Fig. 1, such as the box itself, or to another connecting device similar to that of Figs. 2-6, at least the bushing being constructed to be screwed on the end of the metal conduit and to take connection with an electrical lead, such as a flexible jumper wire or the like.

While it is very desirable to lock the bushing, in its position of good electrical contact with the conduit, as by the locking means shown in Fig. 3, yet, even without such locking means, the bushing (if tightly screwed on the end of the conduit and provided with a jumper secured at its other end inside the box, as at X, Fig. 1) will provide a good electrical contact and circuit making means and particularly for making ground connections inside the connection box. However, in order to insure the permanency of this connection (since even a slight turning of the bushing may seriously impair its effectiveness) it is very desirable that suitable means be provided in connection with the bushing-connector, for locking it against turning on the conduit, such for example, as stud L serving as a simple set screw or as a thread distorting means as shown in Fig. 3.

By thus taking advantage of the fact that a box-interior member (such as the bushing) of the means for securing the conduit to the box, has good electrical connection with the conduit by way of threaded engagement, I have been enabled, by connecting a box-interior jumper to such interior member or bushing, (1) to avoid dependence on the fortuitous electrical connection between the conduit and the box for grounding the conduit and/or box, (2) to avoid all grounding clamps and jumpers outside the box and exposed, (3) to provide an interior jumper which can be employed not only to ground the conduits via the interior of the box but which can be connected also to the box itself, so that in combination with a ground conductor each of the box and the conduits can be permanently perfectly grounded via such ground conductor, and (4) in addition, the service wire to be grounded can be connected to ground by the same ground conductor which is utilized for the conduits and the connection-box, or by a separate conductor, and (5) by similar arrangements, including bushings B⁴ and B⁵, inside the fuse-box connected by load conduit with the switchbox, the fuse-box and all its conduits can be grounded by the same ground conductor as that for the switch-box.

In the example shown in Fig. 1, the neutral (grounded) service wire extends from the service conduit to number three switch contact (from the left), and from that switch contact the neutral ground connection extends via a jumper J² having a terminal lug K to box-stud X which secures such neutral jumper in good electrical contact with an integral part of the switch-box itself, so that when this jumper J² is grounded, not only the neutral wire but the entire switch-box is grounded. The stud X, as shown, may connect to the switch-box the terminal of at least three jumpers, i. e., that from the neutral wire and the two, J¹ and J³ from the two bushing-connectors B¹ and B².

In the example shown in Fig. 1, all the above three jumpers, and accordingly the connection-box, the neutral wire and the service and load conduits, are grounded by a common wire GW, the upper terminal K of which is held by stud X, the lower end of ground connection GW extending to a connection with conduit 4 via a connection to lug L of grounding bushing B. Since conduit 4 is connected to water-pipe P, the entire system thereby is grounded. In cases like this, the cable 11 inside grounding conduit 4 is not necessary altho desirable, because of the good connection with conduit 4 which is provided via such bushing-connector as B, which is connected to the fourth jumper or ground wire GW, secured by stud X to the box. But if an ordinary prior bushing (without jumper connection) is located in place of grounding bushing B shown in Fig. 1, then cable 11, inside grounding conduit 4, should be connected to stud X.

In the fuse-box or cabinet of Fig. 1 at the right is shown a systematic embodiment of the invention which is independent of any exterior arrangement of connections to ground outside of the fuse-box or load conduits. Here the metal box is electrically consolidated with the load conduits mounted in its walls (these two conduits being bonded by the means of the invention, even if the box were of insulating material), by positive means which is independent of direct contact between the box and conduit, i. e. such means being the bushing-connectors B$^3$ and B$^4$, their ears P and projections L and the jumpers J$^4$ and J$^5$, the terminals K of which are forced in contact with one another and with the metal-box by means of stud or bolt X$^1$ and its nut, as shown. By this means, an assured electrical connection is made between the two conduits and between the box and the conduits, whether or not a good electrical connection between the conduits and the box results from the mechanical association of the two by way of the securing means comprising lock-nuts LN and the bushings B$^3$ and B$^4$. Thus, the metal fuse-box and the load conduit MX are effectively grounded when, as shown, the load conduit MC is grounded via bushing B$^2$ inside the switch-box, as above described. The fuse-box and the switch-box are termed herein "connection boxes".

From the above, it will be seen as to the grounding system of the main switch-box that pursuant to the invention the protecting bushings act as ground connections via grounding jumpers located wholly inside the box, these jumpers being grounded by connections inside the box, which include the box itself when of metal as usual; that the ground conduit may have applied to it a bushing-connector like those at the service and load conduits; and that all grounding wires or cables are located either inside the metal-box or in conduits communicating directly into the box, so that such wires are protected thereby against mechanical injury or dislocation. Also their enclosure results in the advantage that no overheating can result in a serious fire hazard.

In Fig. 7 is shown a modified system in which there are two ground connections in parallel from the ends of the grounding jumpers inside the switch-box. Here, as in Fig. 1, a ground wire GW extends from stud X to one of the bushing-connectors at B, said bushing being connected electrically to ground conduit 4 by the threaded engagement therewith and being electrically connected to grounding jumper G, preferably but not necessarily by the specific means shown in Figs. 2–6. In Fig. 7, however, in addition, the grounding cable 11 inside conduit 4 has its upper end extended up beyond conduit 4 and into the switch-box with a terminal K on stud X under the nut, by which means cable 11 is connected to the neutral wire, to the service and load conduits and to the metal switch-box. This construction provides a second grounding path in parallel with grounding conduit 4 itself and wire GW connected thereto.

Stud X of Figs. 1 and 7 and stud X$^1$ of Fig. 1 are brass, bronze, aluminum or other non-rusting stud bolts, screwed into the back or bottom of the box tightly, thru the wall thereof so as to form a tight screwed contact with the metal of the box, after which a nut is placed on the stud on the outside of the box to lock the same securely in place and to prevent its working loose due to any subsequent manipulations. The various soldering lugs K are then placed over stud X and another nut, as 1 of Fig. 4, is used to press all the soldering lugs into intimate contact with each other and with the soldering stud itself, after which a third nut is used as a locknut. These grounding studs are particularly useful when the box is of metal and it is desired to ground the same, but if the box be of insulating material or it is not desired particularly to ground it, or it is otherwise sufficiently grounded, the stud X need not be employed, the various soldering lugs being assembled upon any one of the bushings, B, B$^1$ or B$^2$ by the use of a suitable screw or stud screwed into the hole H intended for the soldering stud L one end of the stud serving to fasten the bushing against loosening and the other end serving as a lead-attaching means, as shown in Fig. 9; or the soldering stud L may itself be used for binding one or more soldering lugs to a bushing and when so used stud L may or may not have a jumper soldered into it. In any case, however, such a stud, as X, may be used, and in any portion of the box desired, as a common binding post for the various soldering lugs K. When one of the functions of this stud X is to ground the box itself, it should be located in a part of the box which is not detachable from the rest of the box, as is sometimes the case with the ends and parts of the sides of the box.

For the purpose of connecting to ground WP the lower end of conduit-enclosed cable 11, a metal fitting 2 as shown in Fig. 1 is interposed between and electrically connected to the lower end of conduit 4 and water pipe WP. This is one of the forms of fitting of United States patent to Cowles No. 1,491,789 of April 29, 1924. The lower end of this fitting 2 has a T-connection TC for water pipe WP, the interior of which T-connection, of course, does not communicate with the lateral opening of fitting 2. The straight part of fitting 2 is screwed on the lower end of conduit 4 and secured thereto by a set screw 15. The lower part of cable, wire or lead 11 is fused to a soldering lug or attaching means 13, and the latter is screwed into good electrical connection with fitting 2 by a bolt 10. Fitting 2 is formed with the lateral opening shown so as to permit access to and visibility of the connection to it of cable 11. T-part TC of fitting 2 provides a most advantageous non-clamping means of securing the fitting to ground pipe WP, particularly in initial installations of the electrical system, as in a new building. But fitting 2 may be of the clamp type and clamped to pipe WP, if desired. Also any fitting other than this Cowles type may be employed at this location. If fitting 2 is secured to WP by a clamp type of Cowles fitting, such fitting should be constructed with not less than two independent clamps, (see Cowles patent), to provide a proper safety factor, and the water pipe should be galvanized at least at the clamped portion. In any case, all the conduits shown may be coated throughout their faces with non-conducting enamel or paint to prevent rusting, this being permitted by the invention, since no portion need be bare to receive a grounding clamp.

From the above, it will be understood that the system of either Figs. 1 or 7 possesses the advantage, in addition to the mechanical protection of the grounding wires and the resulting decrease of fire hazard, that it eliminates all necessity for the use of clamping connections around the service and load conduits outside the switch-box. Another advantage of the new system is that it permits entrance of the service wires thru the back of the connection-box if desired, with accessibility and visibility of the conduit-grounding connections, this being a valuable feature not existing in any other grounding system. Furthermore, the preferred form in Fig. 7, provides a double parallel protected connection to ground which has the following four principal advantages, i. e. (1) low resistance path to ground; (2) a path to ground of high current-carrying capacity; (3) a path to ground, i. e., the surface of grounding conduit 4, which provides a ground path for high frequency currents, such as lightning discharges and carrier waves for radio communication on power lines, etc.; and (4) alternative paths to ground, such that the path via the conduit remains even if cable 11 is destroyed and vice versa.

My improved system is not only better and safer than the prior systems, but owing to the simplicity of the connections and the facility with which they can be installed, it is of lower cost. In actual comparison, the resistance of the ground circuits of my improved system hereof, is about one-third that of the present New York city grounding system; and its current-carrying capacity is about double the same; while its cost is substantially lower, both as to the cost of apparatus and the cost of installing.

In practice, the preferred form in Fig. 7 (with grounding cable 11 and grounding conduit 4 provided with one of my bushing-connectors at B) is used whenever it is desirable to obtain the best possible protection. However, in small installations where the current capacity may be relatively small, the special bushing at B on grounding conduit 4 may be omitted and an ordinary prior bushing there applied; and consequently cable 11 may be the only effective or dependable grounding conductor; conduit 4 being then merely a protection for cable 11, save as to the undependable grounding connection which it may make with the box. But while this connection is frequently undependable for carrying large 60 cycle short circuit ground currents, it nevertheless affords a fairly satisfactory connection for the small high frequency and high voltage currents which may result from lightning disturbances, switching operations, swinging grounds, radio frequency currents, etc., which currents will more readily pass over the surface of the conduit 4 than thru the cable 11. In every case, however, the special bushings $B^1$, $B^2$ and $B^4$ all preferably are employed, together with their connecting jumper leads, the bushings $B^1$ and $B^2$ being preferably connected in common with the neutral jumper $J^2$ and the metal cabinet or switch-box itself, as shown, so that all the same are connected to the common grounding conductor at either grounding cable 11 or both grounding conduit 4 and grounding cable 11. Again, my system may assume a form where separate ground conductors are used, as distinguished from the common conductor of Fig. 1 (conduit 4) or of Fig. 7 (conduit 4 and cable 11); that is, where the neutral wire is connected to one grounding conductor (as to cable 11) and the other elements to be grounded are connected to a separate grounding conductor such as conduit 4, or (in cases where conduit 4 may not extend entirely from the switch-box to water pipe WP) to a second and independent insulated cable within conduit 4. Again, it may be desired to omit the grounding of the service wires entirely, and in such cases the jumper $J^2$ is omitted. All such modifications embody the fundamental of my invention.

The invention hereof is not limited for use in electrical grounding systems, because it is useful with various conduit or pipe connections whether or not the same be employed in grounding systems.

The part, improvement or combination which I claim as my invention or discovery, I particularly point out and distinctly claim as follows:

1. An article of manufacture, for the end of a threaded electric conduit which conduit extends through a wall of a box, comprising an annular member formed with a projecting portion provided with screw-threaded means securing the annular member against loosening, said projecting member being provided with screw-threaded means for attaching an electric conductor thereto, the axes of both said screw-threaded means being at a substantial angle to the wall of the box.

2. A connecting device, for the end of a threaded electrical conduit, which includes an annular portion lying adjacent the conduit and a second portion integral therewith, said second portion being formed with a threaded screw hole with a threaded member therein, the threaded member protruding from said hole in a direction forcing the conduit against the first mentioned portion, thereby improving the electrical contact between the conduit and the annular member of the fitting and holding the device against any tendency to become loose on the conduit, said second portion having screw-threaded means for attaching an electrical conductor thereto.

In testimony whereof I have signed my name to this specification.

STEPHEN W. BORDEN.